(12) United States Patent
Hayashi et al.

(10) Patent No.: US 8,353,227 B2
(45) Date of Patent: Jan. 15, 2013

(54) FASTENING DEVICE

(75) Inventors: Kosei Hayashi, Saitama (JP); Yasuki Ito, Saitama (JP); Shunichi Nakajima, Saitama (JP); Yoshitaka Seki, Saitama (JP); Terunari Saiki, Saitama (JP); Masataka Nakano, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 163 days.

(21) Appl. No.: 12/914,106

(22) Filed: Oct. 28, 2010

(65) Prior Publication Data

US 2011/0120257 A1 May 26, 2011

(30) Foreign Application Priority Data

Nov. 20, 2009 (JP) ................................. 2009-265562

(51) Int. Cl.
*B62K 21/18* (2006.01)
(52) U.S. Cl. ...................................................... 74/551.1
(58) Field of Classification Search .............. 74/551.1, 74/551.2, 551.3, 551.4, 551.5, 551.6, 551.7; 411/368; 180/222; 280/279, 280, 288.4
See application file for complete search history.

(56) References Cited

U.S. PATENT DOCUMENTS

| 4,428,240 A | * | 1/1984 | Schoeps | 73/761 |
| 5,829,933 A | * | 11/1998 | Kramer | 411/156 |
| 6,332,625 B1 | * | 12/2001 | Fukunaga et al. | 280/280 |
| 6,712,541 B1 | * | 3/2004 | Henricksen | 403/344 |

FOREIGN PATENT DOCUMENTS

JP     63-12037 B2     3/1988

* cited by examiner

*Primary Examiner* — Vicky Johnson
(74) *Attorney, Agent, or Firm* — Birch, Stewart, Kolasch & Birch, LLP (57) ABSTRACT

A structure for sufficiently spacing a steering handle from a top bridge, thereby greatly improving design flexibility. A relief portion for allowing the deformation of a washer is formed to overlap a second contact surface and adjacent to a first contact surface as viewed in the axial direction of each bolt member. The first contact surface is located so as not to overlap the second contact surface as viewed in the axial direction of each bolt member. Therefore, a bending force acts on the washer to allow the deformation of the washer. That is, the washer can exhibit a spring function to relax the effect of the bending force. As a result, the steering handle can be sufficiently spaced from the top bridge to thereby greatly improve design flexibility.

20 Claims, 5 Drawing Sheets

FASTENING DEVICE

CROSS-REFERENCE TO RELATED APPLICATIONS

The present application claims priority under 35 USC 119 to Japanese Patent Application No. 2009-265562 filed on Nov. 20, 2009 the entire contents of which are hereby incorporated by reference.

BACKGROUND OF THE INVENTION

1. Field of the Invention

The present invention relates to a fastening device typically adapted to a steering handle to a top bridge.

2. Description of Background Art

A structure is known for fastening a steering handle through an elastic member to a top bridge. See for example, FIGS. 1 and 2 of Japanese Patent Publication No. Sho 63-12037.

As illustrated in FIG. 2 of Japanese Patent Publication No. Sho 63-12037, a handle supporting structure includes an upper bracket (4) (this number in parentheses is the same as that shown in Japanese Patent Publication No. Sho 63-12037, and the same applies to the other numbers in parentheses), an inner sleeve (7) fitted through an elastic member (10) to the upper bracket (4), an inserted portion (6b1) inserted in the inner sleeve (7), a lower member (6b) provided at the upper end of the inserted portion (6b1), and an upper member (6a) for holding a steering handle (5) in cooperation with the lower member (6b).

As illustrated in FIG. 1 of Japanese Patent Publication No. Sho 63-12037, a front elevation of a motorcycle, the steering handle (5) is located in the vicinity of the upper bracket (4). In the case of a vehicle having a long wheel base such that a seat is largely spaced from the upper bracket (4), it is desirable to largely space the steering handle (5) upwardly from the upper bracket (4) for the purpose of providing an easy gripping of the steering handle (5) by an operator. However, in the case of applying this to the structure disclosed in Japanese Patent Publication No. Sho 63-12037, a handle supporting portion becomes large in size and weight.

It is therefore desired to largely space the steering handle (5) from the upper bracket (4) without changing a basic structure and enlarging the handle supporting portion.

SUMMARY AND OBJECTS OF THE INVENTION

It is accordingly an object of an embodiment of the present invention to provide a fastening device typically adapted to fasten a steering handle to a top bridge, wherein a supported member (steering handle) can be sufficiently spaced from a supporting member (top bridge) without enlarging the handle supporting portion, thereby greatly improving design flexibility.

In accordance with an embodiment of the present invention, there is provided a fastening device including a supporting member having a hole, a collar member fitted to the hole, a bolt member mounted to an end of a supported member and inserted through the collar member, and a nut engaged with a threaded portion of the bolt member for releasably fixing the supported member to the supporting member, wherein a washer is interposed between a bolt head of the bolt member and one end of the collar member. The washer is in contact with the bolt head so as to form a first contact surface and is also in contact with the collar member so as to form a second contact surface. A relief portion is provided for allowing the deformation of the washer so as to overlap the second contact surface and adjacent to the first contact surface as viewed in the axial direction of the bolt member.

According to an embodiment of the present invention, the first contact surface is formed radially outside of the second contact surface.

According to an embodiment of the present invention, the bolt member includes a stem portion with the bolt head formed at one end of the stem portion, and the threaded portion formed at the other end of the stem portion. The relief portion is formed on the bolt head so as to surround the stem portion at a position where the stem portion intersects the bolt head.

According to an embodiment of the present invention, the bolt member includes a stem portion with the bolt head formed at one end of the stem portion, and the threaded portion formed at the other end of the stem portion. The stem portion is connected through a round portion to the bolt head so as to gradually increase the sectional area of the stem portion toward the bolt head. The washer is formed with a chamfered portion for accommodating the round portion.

According to an embodiment of the present invention, the bolt member is a flanged bolt having a flange at the bolt head, and the outer diameter of the flange is set larger than the outer diameter of the washer.

According to an embodiment of the present invention, the one end of the collar member projects from the supporting member by a predetermined amount; and a rubber member is interposed between the bolt head and the supporting member, the rubber member being composed of a bottom plate portion having a thickness corresponding to the predetermined amount and a cylindrical portion extending from the outer circumference of the bottom plate portion in the axial direction of the bolt member so as to surround the outer circumferential surface of the washer.

According to an embodiment of the present invention, the supporting member is a top bridge for a motorcycle, and the supported member is a steering handle for the motorcycle.

According to an embodiment of the present invention, the steering handle includes a handle bar adapted to be gripped by an operator and a handle column extending from the handle bar at right angles thereto and fitted to the bolt head.

According to an embodiment of the present invention, the handle column includes a pair of right and left handle columns extending from the handle bar.

According to an embodiment of the present invention, when an external force is applied to the supported member, this external force is first transmitted from the bolt head through the first contact surface to the washer, next transmitted from the washer through the second contact surface to the collar member, and finally transmitted from the collar member to the supporting member.

The first contact surface is located so as not to overlap the second contact surface as viewed in the axial direction of the bolt member. Therefore, a bending force acts on the washer to allow the deformation of the washer. More specifically, the washer can exhibit a spring function to relax the effect of the bending force.

The more the supported member is spaced from the supporting member, the larger a bending moment represented by the product of a force and a distance.

According to an embodiment of the present invention, an increase in the bending moment can be relaxed by allowing the deformation of the washer. As a result, the supported member can be sufficiently spaced from the supporting member, thereby greatly improving design flexibility.

According to an embodiment of the present invention, the first contact surface is formed radially outside of the second contact surface. The diameter of the second contact surface relates to the diameter of the collar member. In this structure, the second contact surface is located radially inside of the first contact surface, so that the collar member can be reduced in diameter.

According to an embodiment of the present invention, the relief portion is formed on the bolt head so as to surround the stem portion at an intersecting position between the stem portion and the bolt head. In the case that the relief portion is formed as an annular groove having an arc in cross section, the stem portion is connected through this arc to the bolt head, thereby avoiding stress concentration at the intersecting position between the stem portion and the bolt head. Since the relief portion is formed on the bolt head, the washer can be made simple in shape.

According to an embodiment of the present invention, the stem portion is connected through the round portion to the bolt head so as to gradually increase the sectional area of the stem portion toward the bolt head, and the washer is formed with the chamfered portion for accommodating the round portion. Thus, the stem portion is connected through the round portion to the bolt head, thereby avoiding stress concentration at the intersecting position between the stem portion and the bolt head.

According to an embodiment of the present invention, the bolt member is a flanged bolt having a flange at the bolt head, and the outer diameter of the flange is set larger than the outer diameter of the washer. The flange serves also as a cover for concealing the washer, thereby improving the appearance.

According to an embodiment of the present invention, the rubber member also serves to cover the outer circumference of the washer, thus concealing the washer. Further, owing to a rubber material, the rubber member can allow the deformation of the washer.

According to an embodiment of the present invention, the supporting member is a top bridge for a motorcycle, and the supported member is a steering handle for the motorcycle. Since the flexibility to the shape of the supported member is large, the shape of the steering handle can be flexibly set. Even when the steering handle is long, stress concentration can be avoided by the deformation of the washer.

According to an embodiment of the present invention, the steering handle is composed of a handle bar and a handle column. The handle column can be extended without the possibility of stress concentration, so that the steering handle can extend toward the operator more effectively.

According to an embodiment of the present invention, a pair of right and left handle columns extend from the handle bar. As compared with the case of a single handle column, the stress applied to each handle column in the case of two handle columns can be reduced half, and the steering handle can therefore be further extended.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A mode for carrying out the present invention will now be described with reference to the attached drawings. The orientation of each drawing is the same as that of the reference numerals included therein.

A preferred embodiment of the present invention will now be described with reference to the drawings. In this preferred embodiment, the fastening device according to the present invention is applied to fasten a steering handle to a top bridge in a motorcycle.

Figure 1:
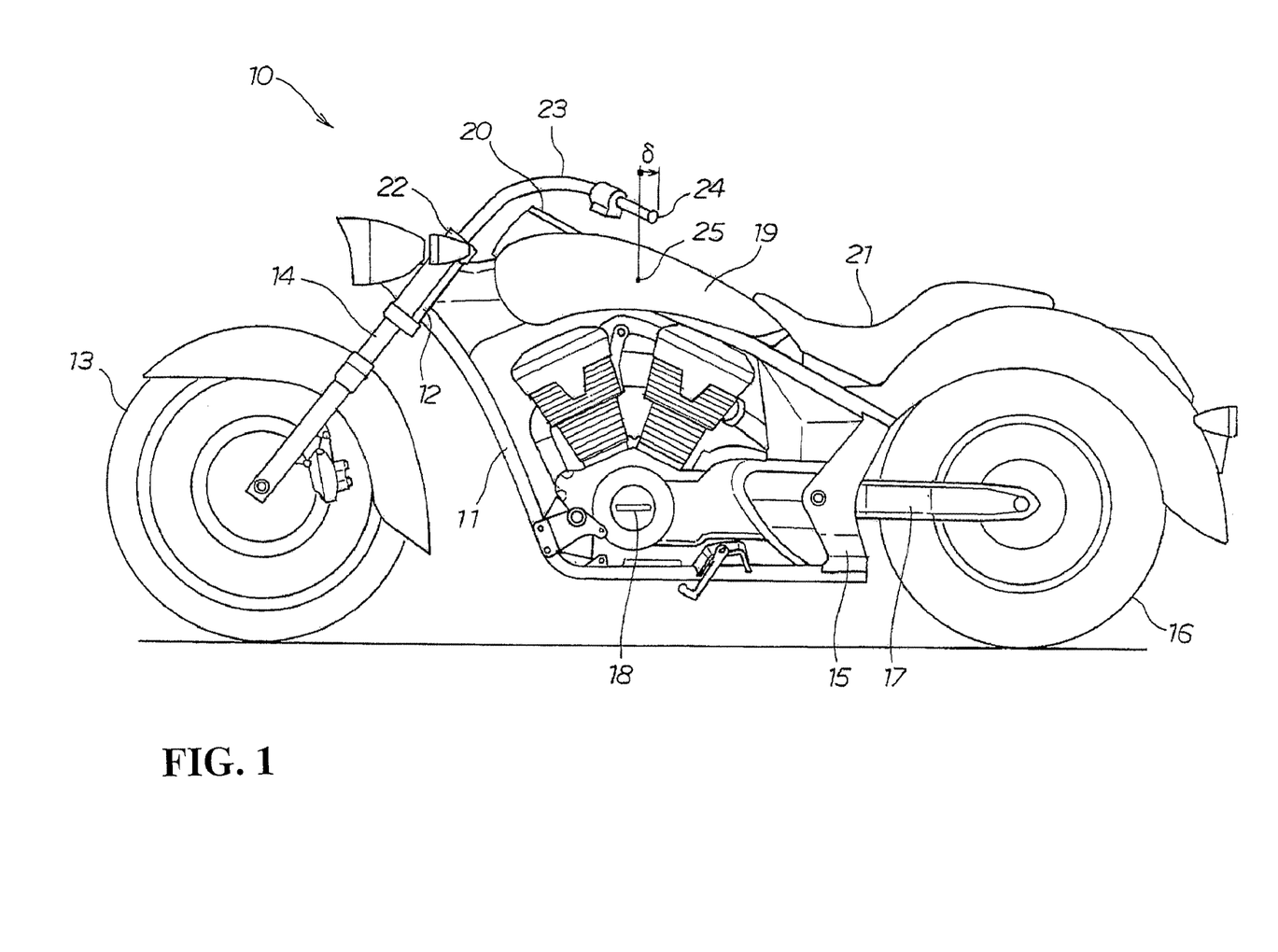
FIG. 1 is a left side view of a motorcycle having a fastening device according to a preferred embodiment of the present invention.

As shown in FIG. 1, a motorcycle 10 primarily includes a body frame 11 configured by combining pipes and frames, a front fork 14 steerably mounted to a head pipe 12 forming a front portion of the body frame 11, a front wheel 13 mounted to the lower ends of the front fork 14, a rear swing arm 17 extending rearward from a pivot plate 15 forming a rear portion of the body frame 11. A rear wheel 16 mounted to the rear ends of the rear swing arm 17 with an engine 18 mounted to a central portion of the body frame 11. A fuel tank 19 is mounted to an upper portion of the body frame 11 above the engine 18 with a meter 20 provided at an upper front portion of the fuel tank 19 in an integral manner. A seat 21 is mounted to the body frame 11 on the rear side of the fuel tank 19 with a top bridge 22 mounted to an upper portion of the front fork 14 on the front side of the fuel tank 19, and a steering handle 23 mounted to the top bridge 22.

As shown in FIG. 1, the steering handle 23 extends long rearward of the vehicle. More specifically, the free end (rear end) of each grip 24 to be gripped by an operator is positioned on the rear side of a longitudinally central point 25 of the fuel tank 19 by a distance δ. Thus, the steering handle 23 extends long rearward of the vehicle so as to be formed along the upper surface of the fuel tank 19, thereby making the vehicle shape streamlined to further improve the design of the vehicle.

The steering handle 23 will now be described in more detail.

Figure 2:
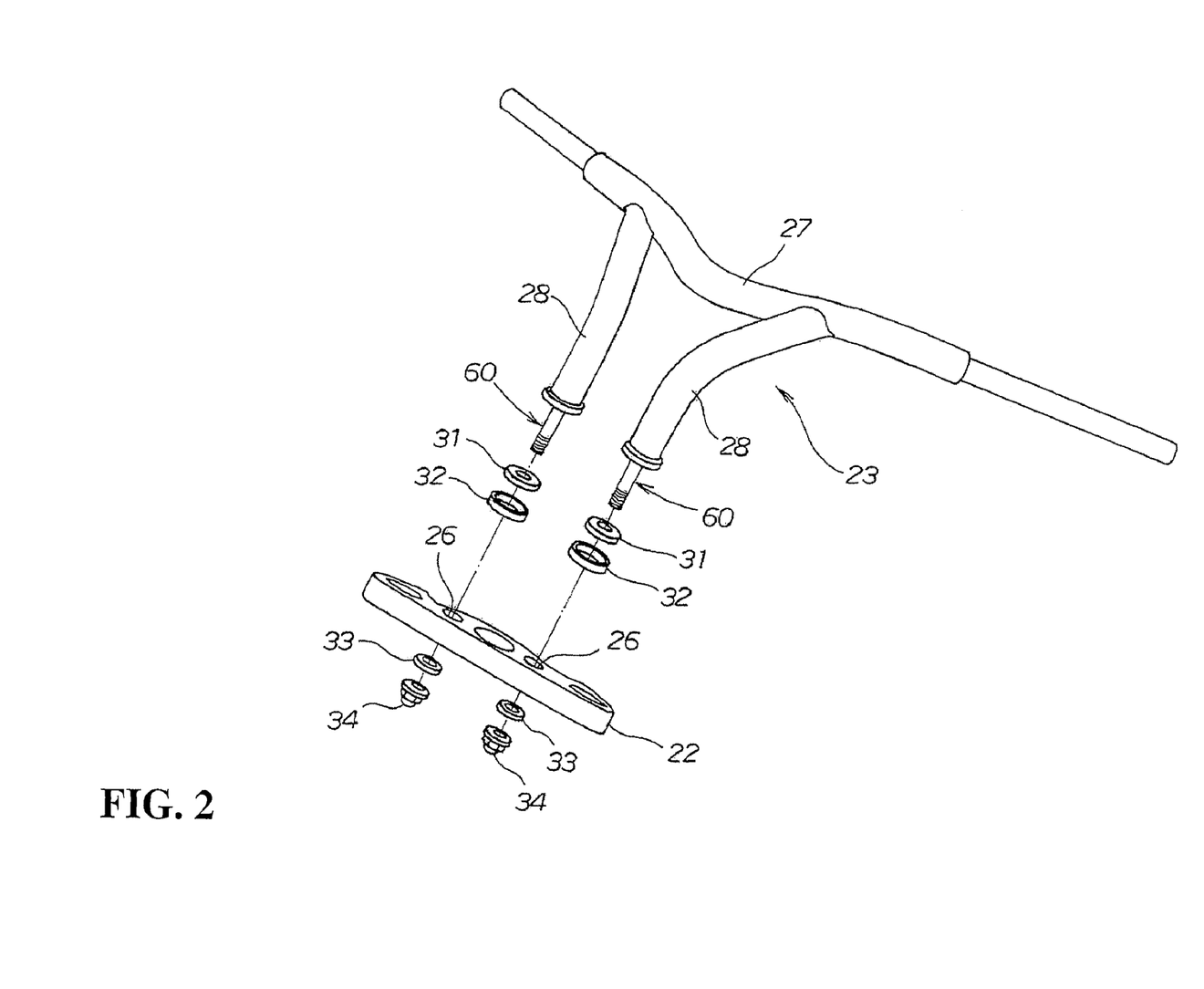
FIG. 2 is an exploded perspective view of a steering handle and a top bridge in the motorcycle shown in FIG. 1.

As shown in FIG. 2, the top bridge 22 is a laterally elongated triangular member formed with a pair of right and left holes 26.

The steering handle 23 includes a laterally extending handle bar 27, a pair of right and left handle columns 28 extending downward from a central portion of the handle bar 27, and a pair of right and left bolt members 60 mounted to the lower ends of the right and left handle columns 28, respectively. The right and left handle columns 28 may be replaced by a single column or three or more columns.

The right and left bolt members 60 of the steering handle 23 are inserted through the right and left holes 26 of the top bridge 22, respectively. A washer 31 and a rubber member 32 are interposed between each bolt member 60 and the top bridge 22. A cap nut 34 is threadedly engaged with the lower end portion of each bolt member 60 projecting from the corresponding hole 26 of the top bridge 22 with a lower washer 33 interposed between the cap nut 34 and the top bridge 22, thereby fixing each bolt member 60 to the top bridge 22. Each cap nut 34 may be replaced by a hexagon nut or a square nut. However, each cap nut 34 is preferable from the viewpoint of external appearance.

A bending moment acting on each bolt member 60 is obtained as the product of an external force applied to the bar handle 27 (e.g., an arm force of the operator) and the length of each handle column 28.

When each handle column 28 is long and the bending moment mentioned above therefore becomes large, an increase in stress to each bolt member 60 is caused. A fastening device having a suitable structure for use in this case according to this preferred embodiment will now be described.

Figure 3:
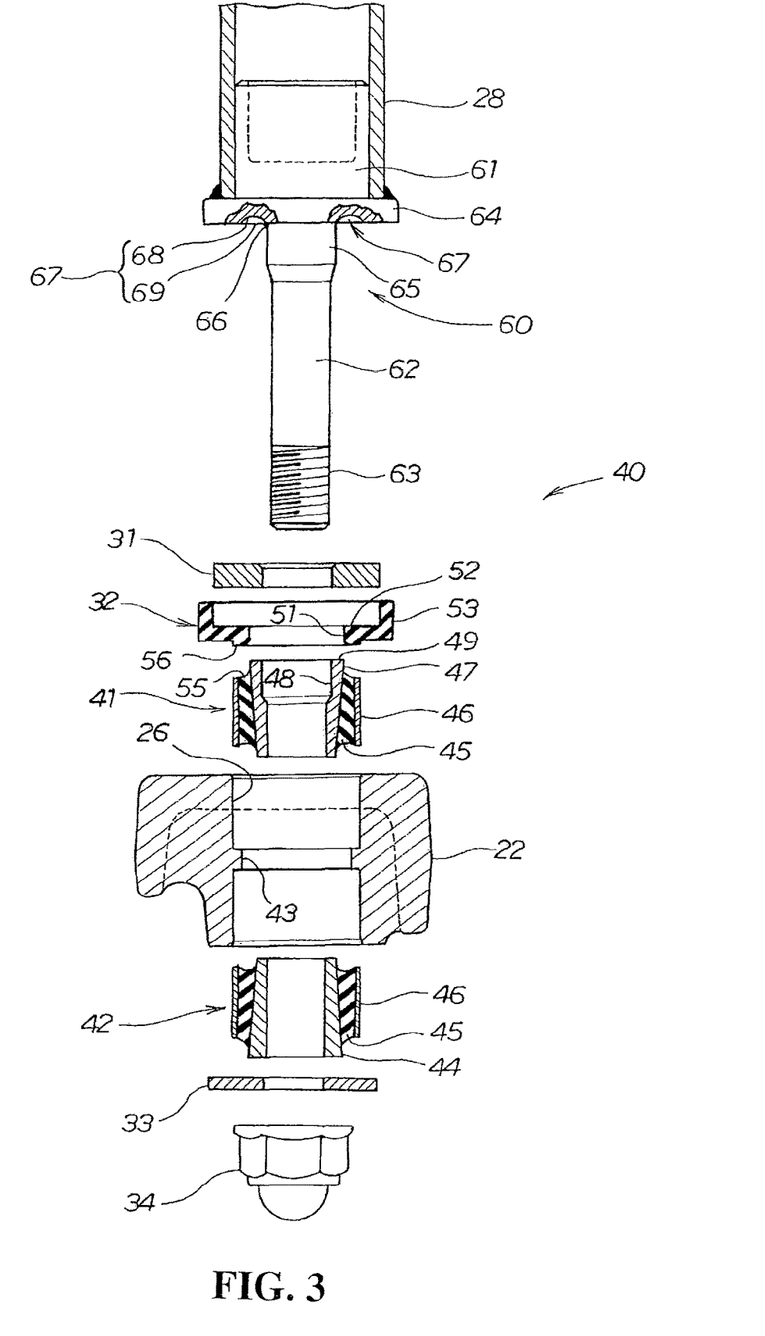
FIG. 3 is an exploded sectional view of the fastening device according to the preferred embodiment.

As shown in FIG. 3, a fastening device 40 according to this preferred embodiment is illustrated. The fastening device 40 includes the top bridge 22 as a supporting member having the holes 26, an upper bush 41 as an upper collar member fitted to the upper half of each hole 26, a lower bush 42 as a lower collar member fitted to the lower half of each hole 26, the lower washer 33 and the cap nut 34 both located below the lower bush 42, the rubber member 32 and the washer 31 both located above the upper bush 41, and each bolt member 60.

While the collar member in the present invention is separated into the upper collar member and the lower collar member in this preferred embodiment, the separation of the collar member is not necessarily be required.

The top bridge 22 is formed with an annular projection 43 for partitioning the upper half and the lower half of each hole 26.

The lower bush 42 as the lower collar member is composed of a collar 44 having a cylindrical inner circumferential surface and a tapering outer circumferential surface, a rubber member 45 provided on the outer circumferential surface of the collar 44, and an outer protective sleeve 46 surrounding the rubber member 45. The collar 44 projects from the upper and lower ends of the outer protective sleeve 46 and the rubber member 45.

Similarly, the upper bush 41 as the upper collar member is composed of a collar 47 having a cylindrical inner circumferential surface and a tapering outer circumferential surface, a rubber member 45 provided on the outer circumferential surface of the collar 47, and an outer protective sleeve 46 surrounding the rubber member 45. However, the upper bush 41 is different from the lower bush 42 in the point that the inner circumferential surface of the collar 47 is composed of an upper large-diameter portion as a bolt neck inserting portion 48 and a lower small-diameter portion.

The upper end of the collar 47 of the upper bush 41 is provided with marking 49 such as coloring or inscription, so as to prevent misassembly of parts.

The upper bush 41 and the lower bush 42 are preliminarily press-fitted in each hole 26 of the top bridge 22.

In the case that the upper and lower collar members are not required to have the function of vibration absorption or vibration isolation, the rubber members 45 and the outer protective sleeves 46 of the upper and lower collar members may be omitted. In this case, the collars 47 and 44 constitute the upper and lower collar members, respectively.

The rubber member 32 is composed of a bottom plate portion 52 having a center hole 51 and a cylindrical portion 53 extending upward from the outer circumference of the bottom plate portion 52. The diameter of the center hole 51 of the bottom plate portion 52 corresponds to the outer diameter of the collar 47. The inner diameter of the cylindrical portion 53 corresponds to the outer diameter of the washer 31. The height of the cylindrical portion 53 corresponds to the thickness of the washer 31.

The thickness of the bottom plate portion 52 substantially corresponds to the amount of upward projection of the collar 47 from the upper ends of the rubber member 45 and the outer protective sleeve 46.

The upper end of the rubber member 45 of the upper bush 41 is formed as an annular recess 55, and the lower surface of the bottom plate portion 52 is formed with an annular projection 56 adapted to be fitted to the annular recess 55.

Each bolt member 60 is composed of a bolt head 61 having an outer diameter corresponding to the inner diameter of each handle column 28, a stem portion 62 extending downward from the bolt head 61, and a threaded portion 63 formed at the lower end portion of the stem portion 62.

Each bolt member 60 is a flanged bolt such that the bolt head 61 is formed with a flange 64 projecting radially outward beyond the outer diameter of each handle column 28. The outer diameter of the flange 64 is set larger than the outer diameter of the washer 31. Further, the stem portion 62 is formed at its upper end (base portion) with a bolt neck 65 larger in diameter than the stem portion 62.

The bolt head 61 is formed with an annular relief portion 67 at a position 66 where the stem portion 62 intersects the bolt head 61 (at the base portion of the bolt neck 65 in this preferred embodiment).

This relief portion 67 functions as a pocket portion for allowing the deformation of the inner circumferential portion (or the outer circumferential portion) of the washer 31.

The configuration of the relief portion 67 is arbitrary. Preferably, the relief portion 67 is configured as an annular groove having a substantially semicircular cross section composed of an arc 68 and a chord 69. The inner end of the arc 68 is smoothly connected to the bolt neck 65.

When the sectional area of a shaft member is rapidly changed, stress concentration occurs remarkably at such a rapidly changed portion. In this preferred embodiment, however, the bolt head 61 is connected through the arc 68 to the bolt neck 65, so that the sectional area of the stem portion 62 can be gradually changed to thereby suppress the stress concentration. As a result, there is no possibility that each bolt member 60 may be broken at the intersecting position 66 between the stem portion 62 and the bolt head 61.

Figure 4:
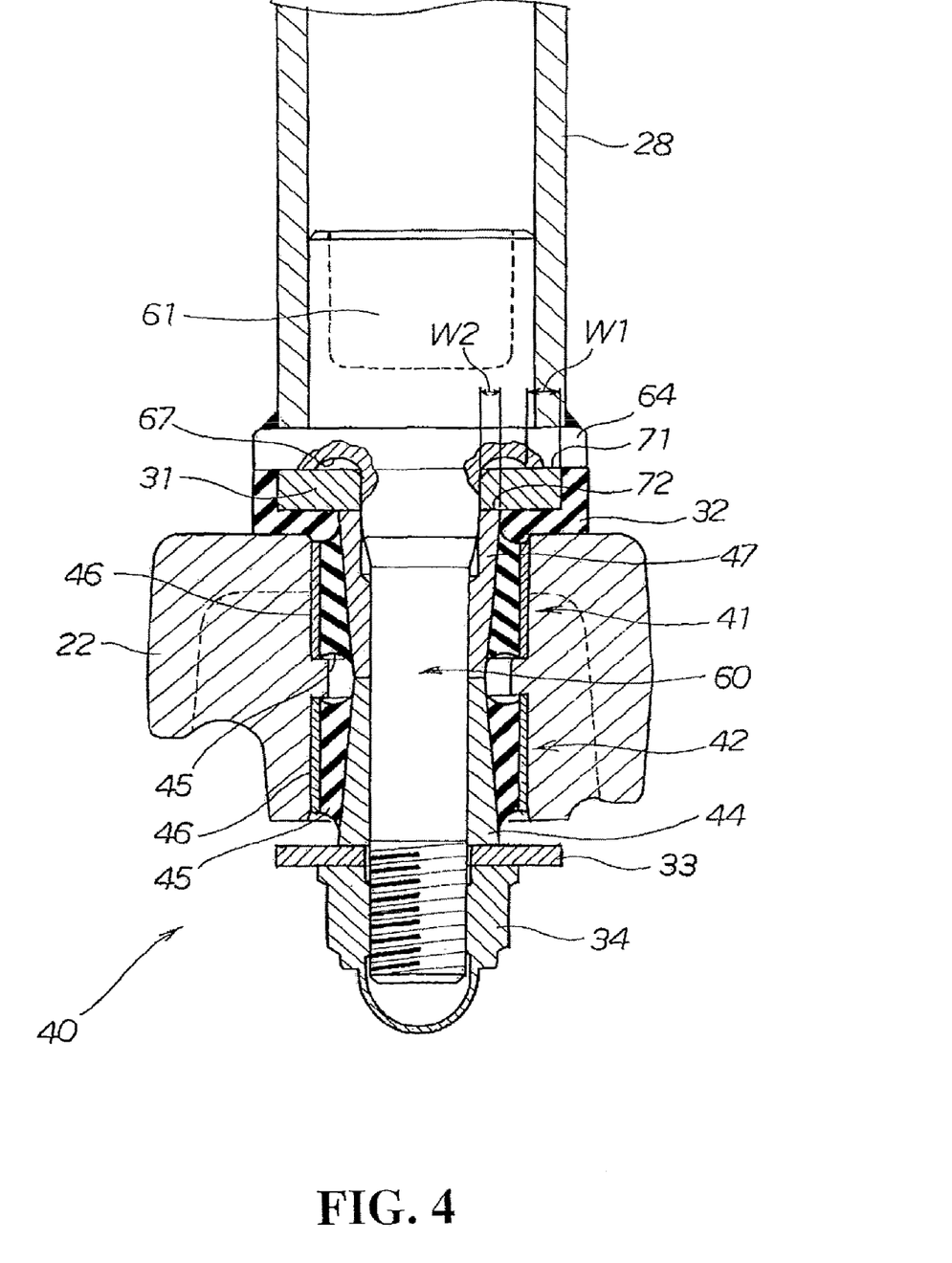
FIG. 4 is a sectional view of the fastening device shown in FIG. 3 in the assembled condition thereof.

FIG. 4 shows the fastening device 40 obtained by assembling the various components mentioned above.

As shown in FIG. 4, the upper surface of the washer 31 is in contact with the bolt head 61 (the flange 64) so as to annularly form a first contact surface 71 having a width W1.

Further, the lower surface of the washer 31 is in contact with the collar member (the collar 47) so as to annularly form a second contact surface 72 having a width W2.

When an external force is applied to the supported member (each handle column 28), most of this external force is first transmitted from the bolt head 61 through the first contact surface 71 to the washer 31, next transmitted from the washer 31 through the second contact surface 72 to the collar member (the collar 47), and finally transmitted from the upper bush 41 and the lower bush 42 to the supporting member (the top bridge 22).

As viewed in the axial direction of each bolt member 60, the relief portion 67 for allowing the deformation of the washer 31 is located so as to overlap the second contact surface 72 and adjacent to the first contact surface 71.

In other words, the first contact surface 71 is located so as not to overlap the second contact surface 72 as viewed in the axial direction of each bolt member 60. Therefore, a bending force acts on the washer 31 to allow the deformation of the washer 31. More specifically, the washer 31 can exhibit a spring function to relax the effect of the bending force.

Although not shown, it is structurally possible to form the first contact surface 71 radially inside of the second contact surface 72, and a similar effect can be exhibited in this structure. However, in this structure, the collar member is necessarily increased in diameter.

To the contrary, according to this preferred embodiment shown in FIG. 4, the first contact surface 71 is formed radially outside of the second contact surface 72. In other words, the second contact surface 72 is formed radially inside of the first contact surface 71, so that the collar member (the collar 47) can be reduced in diameter.

Further, although the flange 64 is not essential, the following effect can be exhibited by the flange 64.

The flange 64 serves also as a cover for concealing the washer 31, thereby improving the appearance.

Further, although the rubber member 32 is not essential, the following effect can be exhibited by the rubber member 32. The rubber member 32 also serves to cover the outer circumference of the washer 31, thus concealing the washer 31. Further, owing to a rubber material, the rubber member 32 can allow the deformation of the washer 31.

A modification of this preferred embodiment will now be described.

Figure 5:
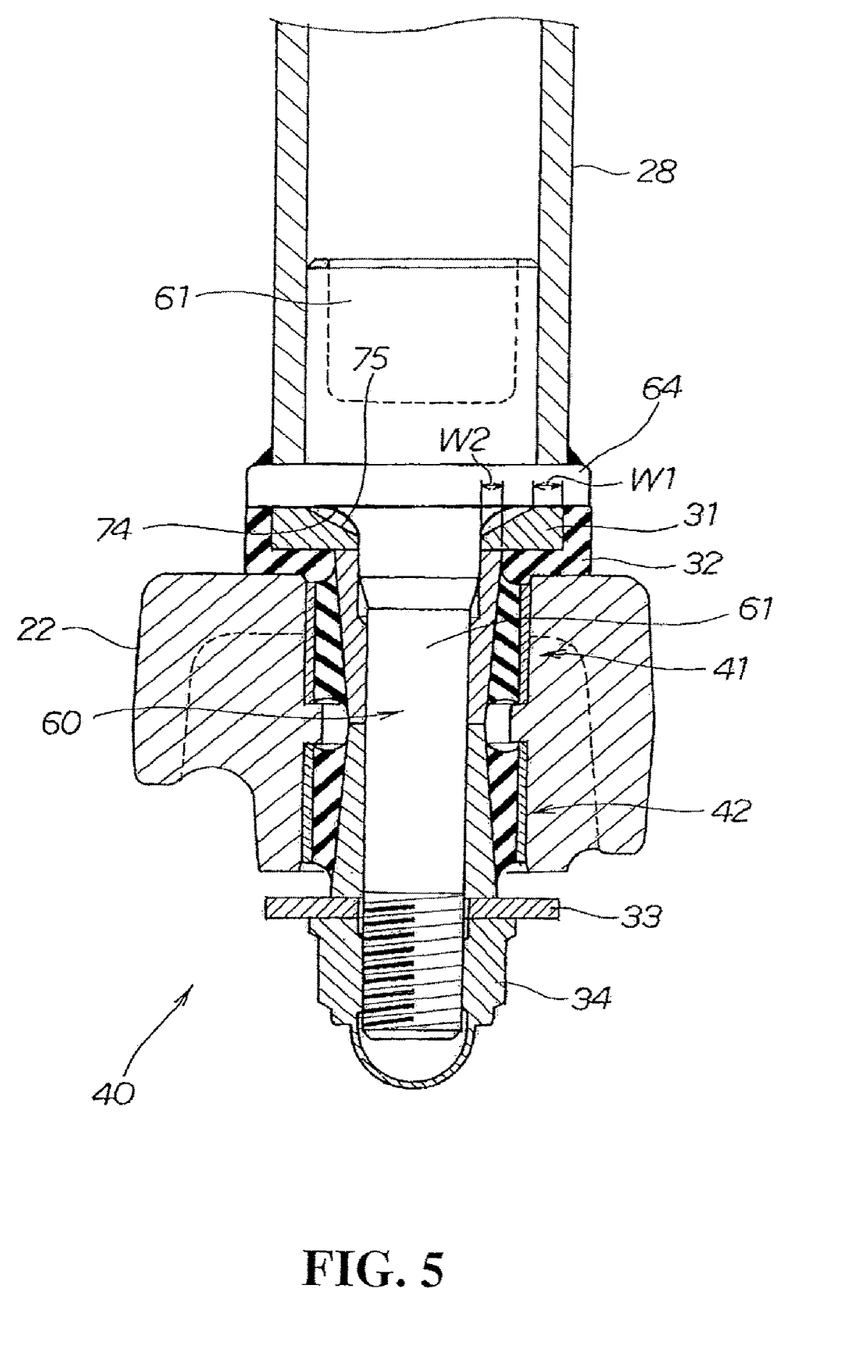
FIG. 5 is a view similar to FIG. 4, showing a modification.

FIG. 5 shows a modification of the preferred embodiment shown in FIG. 4. This modification is different from the preferred embodiment shown in FIG. 4 in the point that the stem portion 62 and the bolt head 61 are connected through a round portion 74 so as to gradually increase the sectional area of the stem portion 62 toward the bolt head 61 and that the washer 31 is formed with a chamfered portion 75 for accommodating this round portion 74. The other structure is the same as that shown in FIG. 4, and the same parts are denotes by the same reference numerals as those shown in FIG. 4 with the description thereof omitted.

As mentioned above, when the sectional area of a shaft member is rapidly changed, stress concentration occurs remarkably at such a rapidly changed portion. In this modification, however, the stem portion 62 is connected through the round portion 74 to the bolt head 61, so that the sectional area of the stem portion 62 can be gradually changed to thereby suppress the stress concentration. As a result, there is no possibility that each bolt member 60 may be broken at the intersecting position between the stem portion 62 and the bolt head 61.

The fastening device according to the present invention is preferably applied to fasten a steering handle to a top bridge for a motorcycle as in this preferred embodiment. However, the application of the fastening device according to the present invention is arbitrary provided that it has a structure including a supporting member having a hole, a collar member fitted to the hole of the supporting member, a bolt member mounted to an end of a supported member and inserted through the collar member, and a nut engaged with a threaded portion of the bolt member for releasably fixing the supported member to the supporting member.

The fastening device according to the present invention is preferably applied to fasten a steering handle to a top bridge for a motorcycle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fastening device comprising:
   a supporting member having a hole;
   a collar member fitted to said hole, said collar member having a predetermined radial width;
   a bolt member mounted to an end of a supported member and inserted through said collar member;
   a nut engaged with a threaded portion of said bolt member for releasably fixing said supported member to said supporting member;
   wherein a washer is interposed between a bolt head of said bolt member and one end of said collar member;
   said washer being in contact with said bolt head to form a first contact surface and being in contact with said collar member to form a second contact surface; and
   a relief portion formed in the bolt head and having a predetermined radial width being greater that the predetermined radial width of said collar, said relief portion overlapping said second contact surface and being adjacent to said first contact surface as viewed in the axial direction of said bolt member for allowing deformation of said washer.

2. The fastening device according to claim 1, wherein said first contact surface is formed radially outside of said second contact surface.

3. The fastening device according to claim 2, wherein:
   said bolt member includes a stem portion, said bolt head formed at one end of said stem portion, and said threaded portion formed at the other end of said stem portion; and
   said relief portion is formed on said bolt head to surround said stem portion at a position where said stem portion intersects said bolt head.

4. The fastening device according to claim 3, wherein said bolt member is a flanged bolt having a flange at said bolt head, and the outer diameter of said flange is set larger than the outer diameter of said washer.

5. The fastening device according to claim 2, wherein:
   said bolt member includes a stem portion, said bolt head formed at one end of said stem portion, and said threaded portion formed at the other end of said stem portion;
   said stem portion is connected through a round portion to said bolt head to gradually increase the sectional area of said stem portion toward said bolt head; and
   said washer is formed with a chamfered portion for accommodating said round portion.

6. The fastening device according to claim 2, wherein said bolt member is a flanged bolt having a flange at said bolt head, and the outer diameter of said flange is set larger than the outer diameter of said washer.

7. The fastening device according to claim 2, wherein:
   said one end of said collar member projects from said supporting member by a predetermined amount; and
   a rubber member is interposed between said bolt head and said supporting member, said rubber member being composed of a bottom plate portion having a thickness corresponding to said predetermined amount and a cylindrical portion extending from the outer circumference of said bottom plate portion in the axial direction of said bolt member to surround the outer circumferential surface of said washer.

8. The fastening device according to claim 2, wherein said supporting member is a top bridge for a motorcycle, and said supported member is a steering handle for said motorcycle.

9. The fastening device according to claim 2, wherein said steering handle includes a handle bar adapted to be gripped by an operator and a handle column extending from said handle bar at right angles thereto and fitted to said bolt head.

10. The fastening device according to claim 2, wherein said handle column includes a pair of right and left handle columns extending from said handle bar.

11. The fastening device according to claim 1, wherein:
said bolt member includes a stem portion, said bolt head formed at one end of said stem portion, and said threaded portion formed at the other end of said stem portion; and
said relief portion is formed on said bolt head to surround said stem portion at a position where said stem portion intersects said bolt head.

12. The fastening device according to claim 11, wherein said bolt member is a flanged bolt having a flange at said bolt head, and the outer diameter of said flange is set larger than the outer diameter of said washer.

13. The fastening device according to claim 1, wherein:
said bolt member includes a stem portion, said bolt head formed at one end of said stem portion, and said threaded portion formed at the other end of said stem portion;
said stem portion is connected through a round portion to said bolt head to gradually increase the sectional area of said stem portion toward said bolt head; and
said washer is formed with a chamfered portion for accommodating said round portion.

14. The fastening device according to claim 1, wherein said bolt member is a flanged bolt having a flange at said bolt head, and the outer diameter of said flange is set larger than the outer diameter of said washer.

15. The fastening device according to claim 1, wherein:
said one end of said collar member projects from said supporting member by a predetermined amount; and
a rubber member is interposed between said bolt head and said supporting member, said rubber member being composed of a bottom plate portion having a thickness corresponding to said predetermined amount and a cylindrical portion extending from the outer circumference of said bottom plate portion in the axial direction of said bolt member to surround the outer circumferential surface of said washer.

16. The fastening device according to claim 1, wherein said supporting member is a top bridge for a motorcycle, and said supported member is a steering handle for said motorcycle.

17. The fastening device according to claim 1, wherein said steering handle includes a handle bar adapted to be gripped by an operator and a handle column extending from said handle bar at right angles thereto and fitted to said bolt head.

18. The fastening device according to claim 1, wherein said handle column includes a pair of right and left handle columns extending from said handle bar.

19. A fastening device comprising:
a supporting member having a hole;
a collar member fitted to said hole;
a bolt member mounted to an end of a supported member and inserted through said collar member;
a nut engaged with a threaded portion of said bolt member for releasably fixing said supported member to said supporting member;
a washer positioned between a bolt head of said bolt member and one end of said collar member;
a first contact surface formed between said washer and said bolt head to form a first contact surface;
a second contact surface formed between said washer and said collar member; and
a relief portion forming a pocket for allowing deformation of said washer into said pocket, said relief portion being formed to overlap said second contact surface and being adjacent to said first contact surface as viewed in the axial direction of said bolt member.

20. The fastening device according to claim 19, wherein said first contact surface is formed radially outside of said second contact surface.

* * * * *